(12) United States Patent
Boris et al.

(10) Patent No.: US 7,174,174 B2
(45) Date of Patent: Feb. 6, 2007

(54) SERVICE DETAIL RECORD APPLICATION AND SYSTEM

(75) Inventors: Adam Boris, West Chicago, IL (US); Daniel McFarland, Barrington, IL (US)

(73) Assignee: DBS Communications, Inc., Schaumburg, IL (US)

(*) Notice: Subject to any disclaimer, the term of this patent is extended or adjusted under 35 U.S.C. 154(b) by 63 days.

(21) Appl. No.: 10/923,479

(22) Filed: Aug. 20, 2004

(65) Prior Publication Data
US 2006/0040642 A1 Feb. 23, 2006

(51) Int. Cl.
*H04Q 7/20* (2006.01)

(52) U.S. Cl. ............... 455/461; 455/435.2; 455/186.1; 379/433.09

(58) Field of Classification Search ............... 455/461, 455/435.2, 432.1, 412.1, 422.1, 403, 409, 455/557, 558, 186.1; 379/433.99, 433.13, 379/211.05, 375.01, 375.02
See application file for complete search history.

(56) References Cited

U.S. PATENT DOCUMENTS

| | | | |
|---|---|---|---|
| 5,301,234 A | | 4/1994 | Mazziotto et al. |
| 5,428,825 A | * | 6/1995 | Tomohiro et al. ........ 455/186.1 |
| 5,577,100 A | | 11/1996 | McGregor et al. |
| 5,722,067 A | | 2/1998 | Fougnies et al. |
| 5,748,720 A | | 5/1998 | Loder |
| 5,915,226 A | | 6/1999 | Martineau |
| 5,950,130 A | * | 9/1999 | Coursey ................ 455/432.1 |
| 6,138,002 A | | 10/2000 | Alperovich et al. |
| 6,157,823 A | | 12/2000 | Fougnies et al. |
| 6,198,915 B1 | | 3/2001 | McGregor et al. |
| 6,223,026 B1 | | 4/2001 | Martschitsch |
| 6,353,736 B1 | | 3/2002 | Hiromichi |
| 6,415,142 B1 | | 7/2002 | Martineau |
| 6,430,406 B1 | | 8/2002 | Frisk |
| 6,434,379 B1 | | 8/2002 | Despres et al. |
| 6,480,710 B1 | | 11/2002 | Laybourn et al. |
| 6,625,439 B2 | | 9/2003 | Laybourn et al. |
| 6,957,062 B2 | * | 10/2005 | Castrogiovanni et al. ... 455/411 |
| 6,985,756 B2 | * | 1/2006 | Castrogiovanni et al. ... 455/558 |

(Continued)

FOREIGN PATENT DOCUMENTS

AU 199951749 B2 7/1999

OTHER PUBLICATIONS

Reference: TS/SMG-040340QR2-Global System for Mobile Communications GSM Technical Specification GSB 03.40 Jul. 1996 Version 5.3.0.

(Continued)

*Primary Examiner*—CongVan Tran

(57) ABSTRACT

A SIM card for a phone has a first memory partition on which a phone user identity and phone network access data are stored. A service usage monitoring application is stored in a memory. The service usage monitoring application (a) logs information about a service used via the phone, (b) creates a service usage record for the service activity based on the information, (c) stores the service usage record in a buffer, (d) creates a reporting message containing at least one service usage data record, (e) sends the reporting message to a remote server at a preset interval based on a triggered event, and (f) purges the at least one service usage record from the buffer upon successful transmission of the reporting message.

21 Claims, 11 Drawing Sheets

U.S. PATENT DOCUMENTS

| | | | |
|---|---|---|---|
| 2001/0037356 A1* | 11/2001 | Clubb et al. | 709/203 |
| 2002/0077076 A1 | 6/2002 | Suryanarayana | |
| 2002/0193093 A1 | 12/2002 | Henrikson | |
| 2003/0008634 A1 | 1/2003 | Laybourn | |
| 2003/0027549 A1 | 2/2003 | Kiel | |
| 2003/0036394 A1 | 2/2003 | Labordere | |
| 2003/0211840 A1 | 11/2003 | Castrogiovanni | |
| 2005/0101323 A1* | 5/2005 | De Beer | 455/435.2 |
| 2005/0148299 A1* | 7/2005 | Buckley | 455/41.2 |
| 2005/0148333 A1* | 7/2005 | Buckley | 455/435.2 |
| 2006/0143098 A1* | 6/2006 | Lazaridis | 705/34 |

OTHER PUBLICATIONS

Source ETSI TC-SMG ICS: 33.060.50; European Telecommunications Standards Institute-Valbonne, France Digital Cellular Telecommunications System (Phase 2+): Technical Realization Of The Short Message Service (SMS) Point-To-Point, no date listed.

* cited by examiner

SERVICE DETAIL RECORD APPLICATION AND SYSTEM

BACKGROUND

1. Technical Field

This invention relates a system and method for actively monitoring and reporting service usage activity on a wireless system, and more specifically, to a system for compiling service usage records for services used on the wireless system and transmitting the service usage records to a remote server for processing.

2. Description of the Related Arts

There are calling/billing systems in the art. Such systems typically include a Subscriber Identity Module smart card ("SIM card") hooked into a cellular telephone, where the SIM cards contain information personal to the user. Such systems require specialized software on the cellular telephone, in order for compilation of call information to occur. For example, in typical systems, a SIM card for a Global System for Mobile Communications ("GSM") cell phone can only be used with certain GSM cell phones having the specialized software on the GSM cell phone itself.

There are also calling/billing systems in the art which include SIM cards on which a running total is kept of the user's minutes and rating occurs on the card. Such SIM cards can be for calling plans where the user pays for minutes and services prior to using the minutes and services. In such SIM cards, a tariff table within the SIM card keeps track of the minutes and service and shuts off service itself when the user's paid minutes and/or services have been used up. Some of these systems conduct billing in real-time on the SIM. There are also additional SIM cards in the art in which complex billing rules are stored on the SIM card itself. Other calling/billing systems in the art allow the user to replenish an account (e.g., add minutes and services) during a call.

SUMMARY OF THE INVENTION

Embodiments of the inventions are directed to a SIM card for a phone or other wireless device. The SIM card for a phone has a first memory partition on which a phone user identity and phone network access data are stored. A service usage monitoring application is stored in a memory. The service usage monitoring application (a) logs information about a service used via the phone, (b) creates a service usage record for the service activity based on the information, (c) stores the service usage record in a buffer, (d) creates a reporting message containing at least one service usage data record, (e) sends the reporting message to a remote server at a preset interval based on a triggered event, and (f) purges the at least one service usage record from the buffer upon successful transmission of the reporting message.

DETAILED DESCRIPTION

Figure 1:
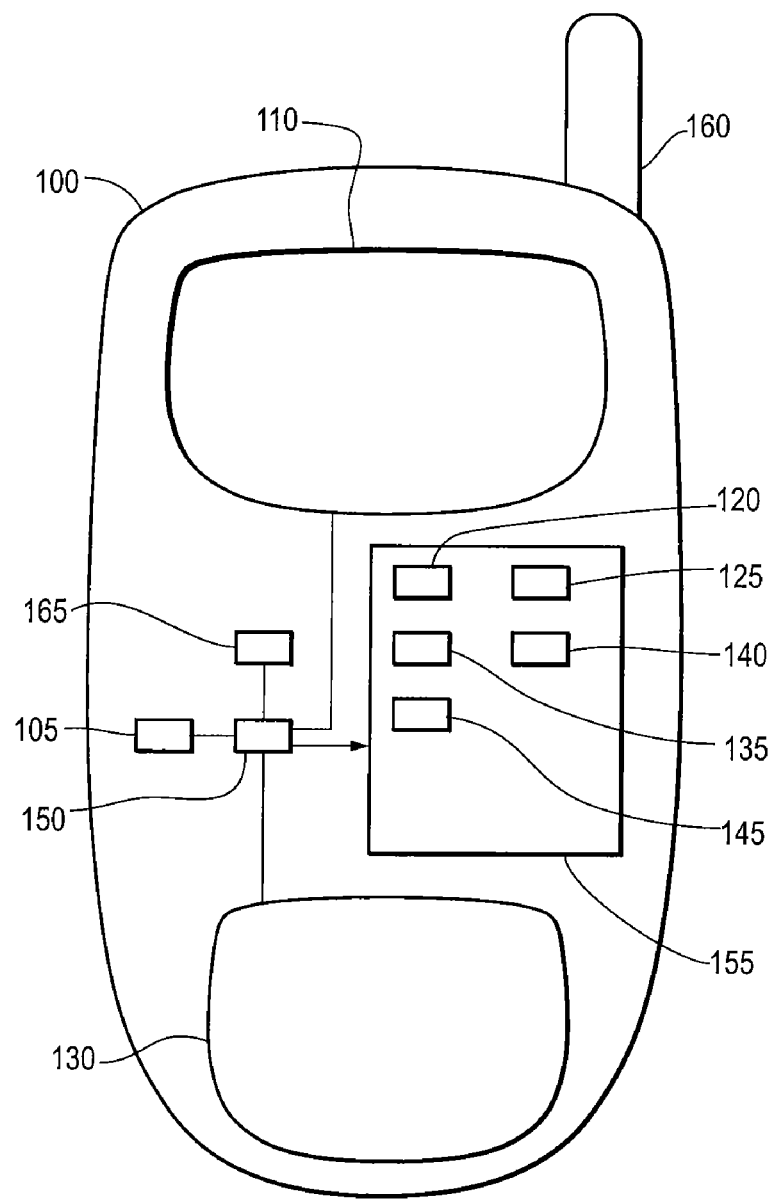
FIG. 1 illustrates a cell phone according to an embodiment of the invention.

An embodiment of the invention is directed to a method and system for compiling information pertaining to service usage made on a wireless network and transmitting the information via a wireless network to a Storage and Control Server ("SCS"). The service usage may be made via cellular telephones on a cellular network, for example. The cell phones may be GSM cell phones. A user may have a SIM card that contains personal user account information such as custom menus, telephone lists, personalized services, network access and authentication protocols, etc. The SIM card may also include a memory which stores instructions or unique software code for a customized service usage monitoring application. The SIM card may be used with any cell phone compliant with GSM standards.

The unique software code for the customized service usage monitoring application may be located entirely within the SIM card in a memory partition. Software on the cellular phone itself may be executed in conjunction with the instructions or code on the SIM card, but the unique instructions or code are contained entirely within the SIM card itself so that the SIM card can be moved from one GSM cellular phone to another GSM cellular phone and the customized service usage monitoring application may still be invoked. The customized service usage monitoring application may periodically send messages to the SCS, the messages containing details of service usage made via the cellular phone. Services in the GSM environment may include calling, messaging, use of General Packet Radio Service ("GPRS"), data calls, purchase transactions, downloading, streaming media, picture messaging, etc. The service usage records may be sent using the Short Message Service ("SMS") format or in any other data format such as GPRS, User Datagram Protocol ("UDP"), a circuit-switched data calling protocol, or any other bearer channel available to the wireless phone. For example, the messages may contain information about the starting time and stopping time of a call or service, as well as the number and name of the called and calling parties. The messages may also contain information relating to an amount of The SCS may contain information relating to the usage on the user's account to determine how to charge for services and to decide whether to activate or terminate service.

An embodiment of the invention may also be implemented in a Code Division Multiple Access ("CDMA") environment. In a CDMA environment, the available services may include, e.g., voice calling, messaging, Evolution Data Only ("EvDO"), single carrier (1x) radio transmission technology ("1xRTT"), circuit-switched data, packet data, etc. The service usage records for an embodiment in a CDMA environment may be sent using SMS, 1xRTT, UDP, a circuit-switched data calling protocol, or any other bearer channel available to the wireless phone.

As described below, terms such as "cell phone", "cellular phone", "cellular network", "cellular services" are used to identify in a generic way any and all wireless common carrier phones, networks and services irrespective of the technologies (e.g., GSM, TDMA, CDMA, etc.) and frequencies (e.g., 800 MHz, 1900 MHz, Cellular band, PCS band, etc.) of operation.

FIG. 1 illustrates a cell phone 100 according to an embodiment of the invention. The cell phone 100 may be a GSM cell phone. GSM is a digital cellular phone technology based on Time Division Multiple Access ("TDMA") that is the predominant system in Europe, but is also used around the world. Operating in the 900 MHz and 1.8 GHz bands in Europe and the 850 MHz Cellular band and 1.9 GHz PCS band in the U.S., GSM defines the entire cellular system, not just the air interface (TDMA, Code Division Multiple Access ("CDMA"), etc.).

The cell phone 100 includes a SIM card 105 that contains user account information such as custom menus, telephone lists, personalized services, network profile information, etc. The SIM card 105 is tiny computer in the mobile phone 100. It has memory (for data and applications), a processor and the ability to interact with the user. Current SIM cards 105 typically have at least 16 to 64 kb of memory, which provides plenty of room for storing hundreds of personal phone numbers, text messages and other value-added services.

The SIM card 105 provides portability for the user's personal settings and information. For example, any GSM phone becomes immediately programmed after plugging in a SIM card 105, thus allowing GSM phones to be easily rented or borrowed. The portability also makes it possible for a user to carry a mobile subscription and data through different types and generations of GSM phone or to a different GSM phone if the user's GSM phone were faulty or stopped working for some reason. The interfaces between the mobile handset and the SIM card 105 are fully standardized and there are already specifications in place for 3rd generation handsets and SIM cards 105. Similar standards are also in place for CDMA handsets and their SIM card interfaces. This application can be applied similarly in a CDMA or Digital European Corldless Telephone ("DECT") environment as well.

GSM also provides a Short Messaging Service ("SMS") that enables text messages up to 160 characters in length to be sent to and from a GSM phone. It also supports data transfer at 9.6 Kbps to packet networks, Integrated Services Digital Network ("ISDN") and Plain Old Telephone System or Service ("POTS") users. GSM is a circuit-switched system that divides each 200 kHz channel into eight time slots.

General Packet Radio Service ("GPRS") is an enhancement to the GSM mobile communications system that supports data packets. GPRS enables continuous flows of IP data packets over the system for such applications as Web browsing and file transfer. GPRS differs from GSM's short messaging service (GSM-SMS), which is limited to 160 bytes in each message (messages may be combined and reassembled to transfer larger files or messages).

The cell phone 100 may include a display 110, the SIM card 105, an SMS and GPRS Bearer Capability 115. The display 110 may be a Liquid Crystal Display ("LCD"). The cell phone 100 may also include a binary download manager application 120, which may be an application utilized to download ring tones from a source such as the Internet. A keypad 130 may be utilized to allow the user to enter a number to be called, or navigate through a menu on the display, for example. A menu interface application 125 may provide an interface between the keypad 130 and the display 110. The cell phone 100 may also include a wireless Internet browser 135, which the user may utilize, via the keypad 130 and the display 110, to access the Internet. A Wireless Application Protocol/Wireless Instant Messaging ("WAP/WIM") application 140 contains necessary protocols for wireless data communication and web browsing. A Java 2 Platform, Micro Edition ("J2ME") application 145 contains necessary instructions and other software to implement the java within the cell phone 100. The cell phone 100 may include a processor 150 to control operation of the cell phone 100 and execute necessary instructions or code to implement the various services within the cell phone. A memory 155, such as a Random Access Memory ("RAM"), may store the instructions or code to implement the various applications. The cell phone 100 may include an antenna 160 for communication. Finally, the cell phone 100 may include a clock/timer 165 for keeping time such as, e.g., the time of day for display on the display 110 and the start and stop time of a call.

Figure 2:
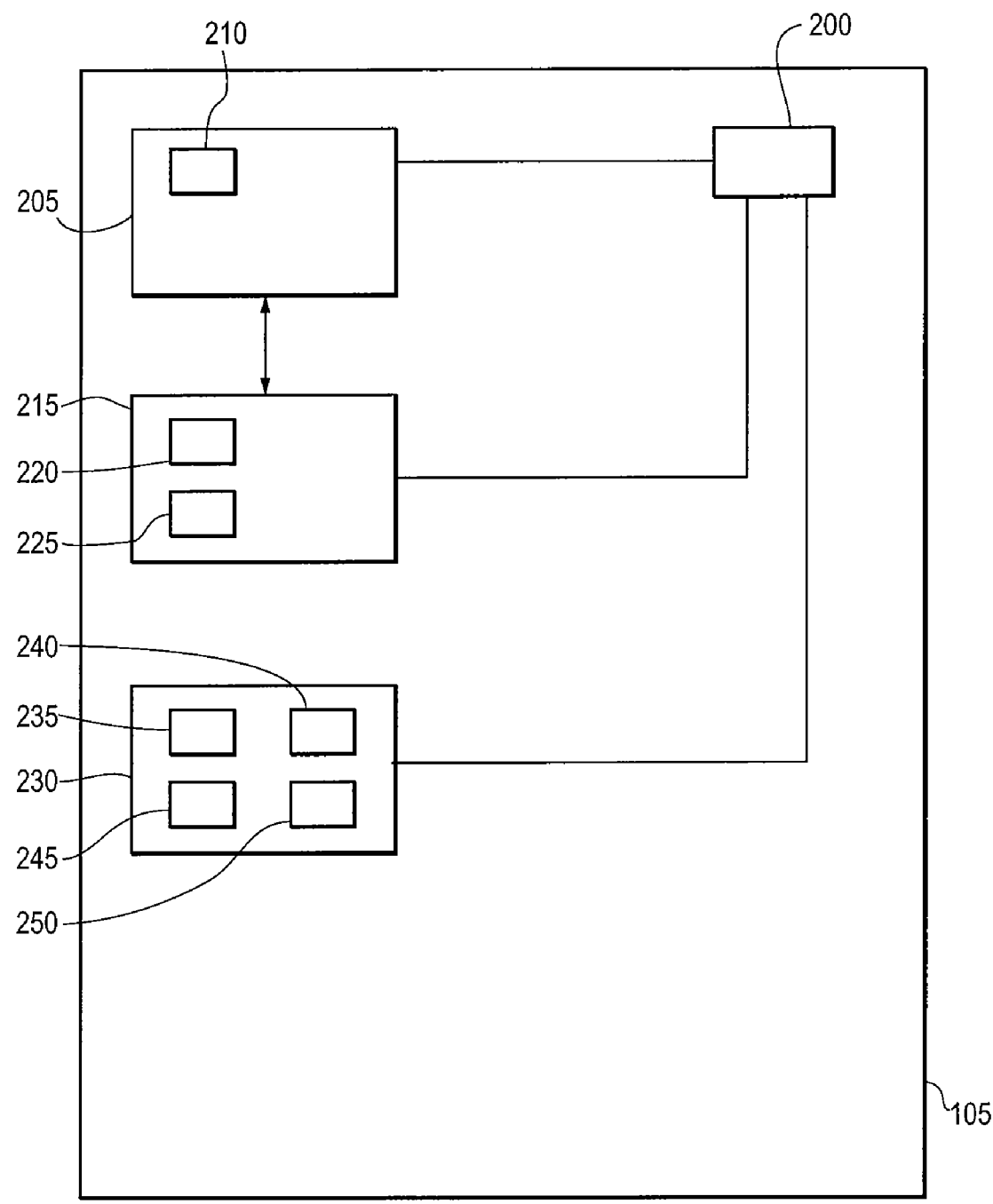
FIG. 2 illustrates a SIM card according to an embodiment of the invention.

FIG. 2 illustrates a SIM card 105 according to an embodiment of the invention. The SIM card 105 may include a processor 200 and memory devices 205, 215, and 230. Each of the memory devices 205, 215, and 230 may be a Random Access Memory ("RAM"), a flash memory, or any other suitable type of memory device. Although FIG. 2 shows three separate memory devices 205, 215, and 230, other embodiments may include a single memory device where the contents of memories 205, 215, and 230 are separated from each other by partitions.

Memory device 205 may include information or data specific to the carrier utilized by the cell phone 100. For example, memory 205 may include GSM user identity and network access data 210 for a carrier such as Cingular, T*Mobile, or any other wireless carrier.

Memory device 215 may include data or program instructions specific to an operator of a service management system for using a carrier network. The operator may be the carrier, or it may be a separate entity. In the event that it is a separate entity, common access between the contents of memories 205 and 215 is limited to one or two call control GSM elemental files. This limited access feature may be included for security purposes. A service usage monitoring application 220 may be stored within the memory device 215, as well as a personalization parameters 225. The personalization parameters 225 may include parameters for determining how often the SIM 105 reports service usage records for the user. These parameters can include (a) time intervals for reporting service usage records; (b) the number of service usage records reported at a time; (c) the amount of data to store in a buffer prior to transmitting the service usage records; and (d) specific events triggering the reporting (e.g., at power-up or power-down of the cell phone 100), etc. Additional parameters include limits on the length of a call made with the cell phone 100 (inbound calls may also be limited to different time lengths than outbound calls). The parameters may also specify which services need to be reported (e.g., if the user has a service plan allowing unlimited SMS messages, it may not be necessary to send SMS usage records). The personalization parameters are customizable and may be dynamically changed at any time by the SCS by sending a message to the mobile device, even during a call.

The service usage monitoring application 220 may be a program which compiles information on all calls or service usage made by the user of the cell phone 100 and periodically sends the information to the SCS for processing. The service usage monitoring application 220 may be designed so that once the information is sent out from the SIM card 105, it is no longer saved within the memory device 215. Consequently, the SIM card 105 may utilize a relatively small memory device 215. The service usage monitoring application 220 may periodically send the service usage records via SMS messages.

Memory device 230 may be utilized to store third-party applications. Memory device 230 may include a JAVA Virtual Machine 235 and a proactive SIM Application Toolkit ("SAT") 240. The proactive SAT 240 is a value added SIM service technology, capable of delivering secure, flexible, user-friendly value added services on existing networks and handsets. The value added services may be the display of sports scores, weather information, map directions, or the user's bank information, for example. The proactive SAT 240 was defined in the GSM 11.14 standard for 2G networks. From release 4 onward, GSM 11.14 is replaced by 3GPP 31.111 which also includes specifications of a Universal Subscriber Identity Module ("USIM") Application Toolkit ("USAT") for 3G networks.

With the development of the SAT 240, the SIM card 105 can be programmed with applications that appear on the cell phone 100 display 110 as menu items. The SAT 240 is a technology that lets the SIM card 105 issue commands to the cell phone 100. These commands range from displaying menus and getting user input, to sending and receiving SMS messages. The SAT 240 is essential for implementing security critical applications, since it allows for custom encryption. The SAT 240 technology is incorporated into many major mobile telecommunication standards.

Memory device 230 of the SIM card 105 may also include a Public Key Infrastructure ("PKI") processor 245 to encrypt data to be sent out from the SIM card 105. The memory device 230 may also include an extended SMS protocol application 250, which invokes SMS protocols for communication.

The SIM card 105 may also include the processor 200 to execute code and implement applications stored within the memory devices 205, 215, and 230.

Additional embodiments may be implemented without use of a SIM card 105. Specifically, the service usage monitoring application 220 described above with respect to FIG. 2, may be implemented directly by a cell phone 100. Alternatively, the service usage monitoring application may be implemented by an alternative device for accessing a network such as a modem, and the network may be wireless, hard-wired, Voice-Over-Internet-Protocol ("VOIP"), or any other suitable type of network.

Figure 6:
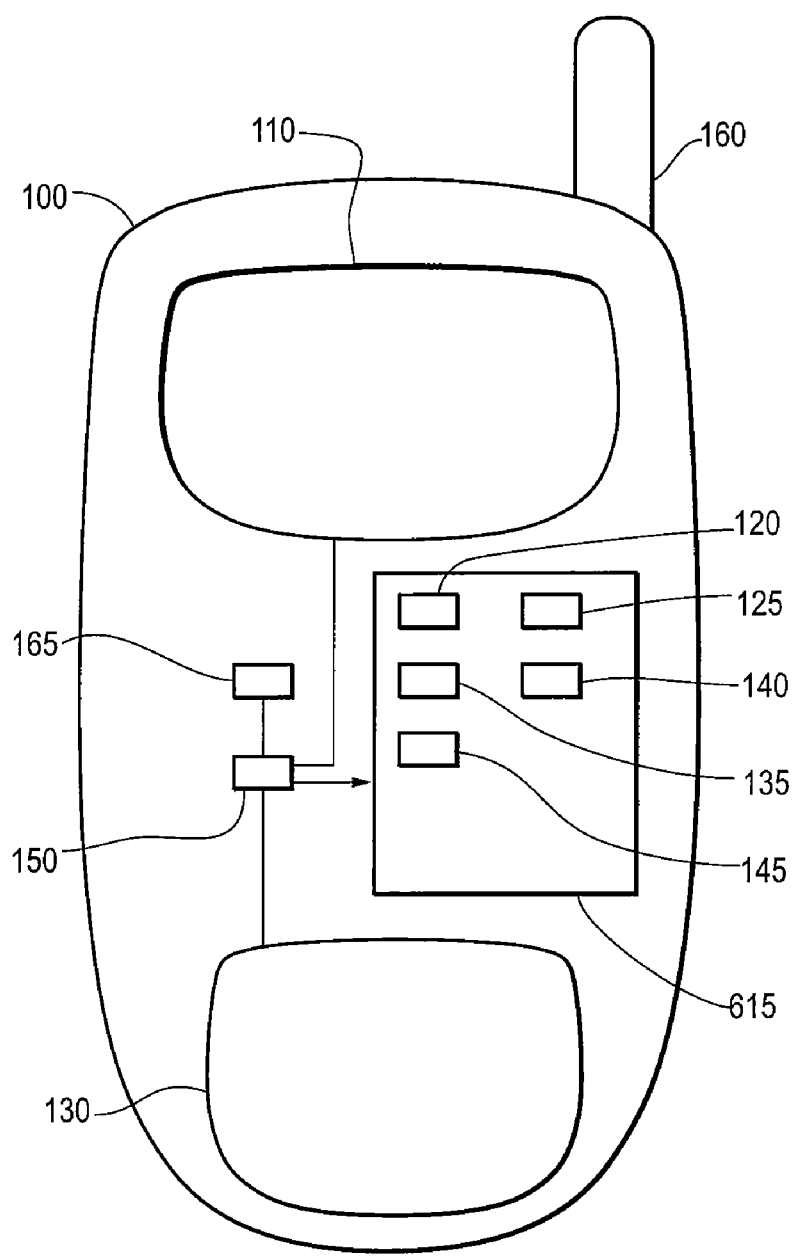
FIG. 6 illustrates a cell phone for accessing a network according to an embodiment of the invention.

FIG. 6 illustrates a cell phone 100 for accessing a network according to an embodiment of the invention. The cell phone 610 of FIG. 6 is similar to the cell phone 100 of FIG. 1, except that cell phone 600 does not have a SIM card 105, unlike FIG. 1. The memory 615 is also similar to the memory 155. The memory 615 may include user identity and network access data. The service usage monitoring application 200 may also be stored on the memory.

Figure 3:
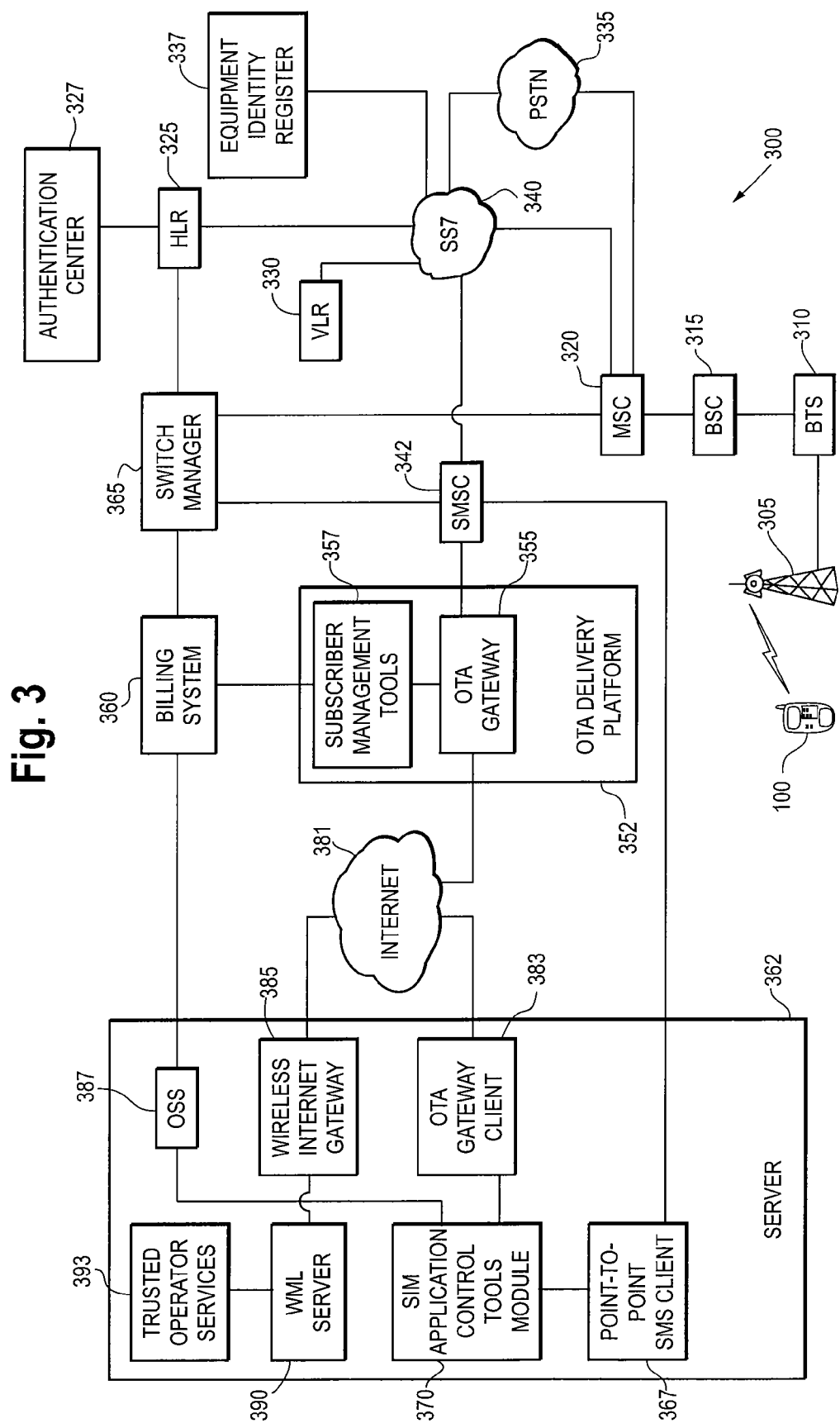
FIG. 3 illustrates a diagram of a cellular system according to an embodiment of the invention.

FIG. 3 illustrates a diagram of a cellular system 300 according to an embodiment of the invention. Although only a single cell phone 100 is shown, in practice this system 300 may be used with multiple cell phones 100 at any time. When the service usage monitoring application 220 determines that it is time to send service usage records to the SCS, it may cause the SIM card 105 to generate an SMS message containing the service usage records. The SIM card 105 is in communication with the radio transceiver 160 of the cell phone 160, and may cause the cell phone to transmit out the SMS message or messages containing the call records. The SMS messages are transmitted on the Stand-alone Dedicated Control Channel ("SDCCH") during an idle state of the cell phone 105. The SDCCH is used in a GSM system to provide a reliable connection for signaling. If the user is on a call at the time the SMS messages are generated, then the SMS messages are transmitted on the Slow Associated Control Channel ("SACCH"). The SACCH is a GSM signaling channel that provides a relatively slow signaling connection. The SACCH is associated with either a traffic or dedicated channel.

The SMS messages are received by a communication tower 305 and then routed to a Base Transceiver Station ("BTS") 310. The BTS 310 may comprise radio transmission and reception devices and antennas. The BTS 310 may be in contact with a Base Station Controller ("BSC") 315 via a "land line" interface. The BSC 315 acts as equipment manager for the radio interface. This may be done via remote commands to the BTS 310 and the cell phone 100. The BSC 315 may manage more than one BTS 310.

"Cellular communications" refers to a sub-field of mobile communications in which the geographical area is subdivided into cells. Each cell is handled by a BTS 310. End-user devices (such as cell phones 100 or vehicle-mounted phones) are called Mobile Stations ("MS") and they talk to the BTS 310 using an over-the-air radio interface. This is the only wireless interface in the cellular system 300 which means it is based on radio communication. Since the radio frequency spectrum is at a premium, the aim is to pack as many MSs as possible in a single radio frequency band. Unlike other radio systems, in cellular communications the MS is constantly moving through different cells, as the end-user moves about. This transition from one cell to the other is meant to be transparent to the end-user. To accomplish this, the MS and BTS 310 perform something called "hand-over." A hand-over involves seamlessly handing over the MS from one BTS 310 to another, when the user crosses a cell. Other key entities which are part of the cellular system 300 include a Mobile services Switching Center ("MSC") 320 which connects the cellular system 300 to external networks such as the regular phone system, a Home Location Register ("HLR") 325 which contains information about the user and the current location of the MS, and a Visitor Location Register ("VLR") 330 which contains dynamic information as well as copies of the HLR 325 for MSs currently in the area. The HLR 325 may be in communication with an authentication center 327 which authenticates the user.

The VLR 330 may contain all the subscribers who are currently visiting within the service area. The HLR 325 may contain all the subscribers within the provider's home service area.

The system 300 may utilize a Signal System 7 ("SS7") network 340. SS7 is a protocol used in a public switched telephone system (the "intelligent network" or "advanced intelligent network") for setting up calls and providing services. The SS7 network 340 is a separate signaling network that is used in Class 4 and Class 5 voice switches.

The SS7 network 340 sets up and tears down the call, handles all the routing decisions and supports all modern telephony services such as 800 numbers, call forwarding, caller ID and local number portability (LNP). The voice switches known as "service switching points" ("SSPs") query "service control point" ("SCP") databases using packet switches known as "signal transfer points" ("STPs").

Accessing databases using a separate signaling network enables the system to more efficiently obtain static information such as the services a customer has signed up for and dynamic information such as ever-changing traffic conditions in the network. In addition, a voice circuit is not tied up until a connection is actually made between both parties.

An International Mobile Equipment Identifier ("IMEI") 337 is used to uniquely identify the mobile communications device 100 in a GSM network. The SIM card 105 of cell phone 100 also includes a unique electronic serial number (a circuit card ID ("CCID")), circuit card ID). The equipment identity register ("EIR") 337 contains a list of IMEI's for stolen cell phones, for example, so that when a user tries to use a cell phone 100 having an IMEI on a banned list, service is not initiated. In other embodiments, the equipment identity register 337 need not be utilized.

The Public Switched Telephone Network ("PSTN") 335 is a worldwide voice telephone network. Once only an analog system, the heart of most telephone networks today is entirely digital. In the U.S., most of the remaining analog lines are the ones from your house or office to the telephone company's central office ("CO").

The MSC 320 connects a landline PSTN 335 system to the mobile phone system. The MSC 320 is also responsible for compiling call information for billing and handing off calls from one cell to another.

A Short Message Service Center ("SMSC") 342 allows SMS messages to be sent to and from the cell phone 100. The SMSC 342 provides an interface enabling effective exchange of large quantities of text messages (i.e., SMS) between the company, where it is based, and GSM users. The transfer of SMSs to cell phone 100 users takes place via GSM networks. It allows for sending both text and graphic messages, such as the operator's logo or picture messages, and sending ringtones. This interface may be based on a direct or indirect TCP connection to GSM network operators using the SM-PP protocol, bi-directional email addressing for SMS messages, or a direct or indirect SS7 interface to the carrier's SMSC. An access protocol assigned to a given operator is used for exchanging messages with the SMSC 342. In its most recent version, the system also provides for handling multimedia MMS messages. The cellular system 300 may also include an Over-The-Air ("OTA") delivery platform 352. OTA is a technology used to communicate with, download applications to, and manage a SIM card 105 without being connected physically to the SIM card 105. OTA enables a Network Operator to introduce new SIM services or to modify the contents of SIM cards 105 in a rapid and cost-effective way. OTA is based on client/server architecture where at one end there is an operator back-end system (customer care, billing system, application server, etc.) and at the other end there is the SIM card 105.

The operator's back-end system sends service requests to an OTA Gateway 355, which transforms the requests into Short Messages and sends them onto the SMSC 342 which transmits them to a subscriber's SIM card 105 in the field. The OTA Gateway 355 receives Service-Requests through a Gateway API that indicates the actual card to modify/update/activate. In fact, inside the OTA Gateway 355 there is a card database that indicates for each card, the SIM vendor, the card's 105 identification number, the International Mobile Subscriber Identity ("IMSI") and the Mobile Subscriber ISDN Number ("MSISDN"). The OTA delivery platform 352 may encrypt messages and send them to the SIM card 105, where they are decrypted.

The communication between the SCS 362 and the SIM 105 need not be made through the OTA delivery platform 352. Instead, it may be made via SMS messages, or any other suitable messaging format utilizing the SMSC or a direct data bearer channel, such as GPRS 342.

The service request is then formatted into a message that can be understood by the recipient SIM card 105. To achieve this, the OTA Gateway 355 has a set of libraries that contain the formats to use for each brand of SIM cards 105. The OTA Gateway 355 then formats the message differently depending on the recipient SIM card 105.

A formatted message is then sent to the SMSC 342 using the right set of parameters as described in GSM 03.48. Next, the OTA Gateway 355 issues as many SMS messages as are required to fulfill the Service-Request. In this operation, the OTA Gateway 355 is also responsible for the integrity and security of the process.

The OTA Delivery Platform 352 also includes subscriber management tools 357. The subscriber management tools 357 may be utilized to manage the user's (i.e., the "subscriber's") usage (e.g., to change permissions or cut off services). The subscriber management tools 357 may be in communication with a billing system 360. The billing system 360 may also interface between a service platform within the SCS 362 and a switch manager 365. The switch manager 365 take orders from the billing system 360 and may have a function of initializing various communications servers for the user, such as the HLR 325, SMSC 342. The service platform within the SCS 362 may contain information about the user of the cell phone 100, such as, e.g., the user's rating, payment plan, minutes, and other services such as voicemail, call waiting, etc.

An advanced billing and rating system 387 within the SCS 362 may be operated and controlled by the carrier or by a separate entity who receives call records, makes adjustments to the user's account based on the usage of the wireless services 100. In the event that the user has already paid for certain services, access time, or minutes, and the user uses up all available units of service, the SCS 362 may send a message to the phone or to the wireless carrier's network interface to suspend services for the user, which may include the termination of a call in progress. In other embodiments, the SCS 362 may simply cause the billing system 360 to keep a running total of the amount of services consumed by the user for the call. The SCS 362 may include a point-to-point SMS client 367. The point-to-point SMS client 367 may receive the SMS messages in which service usage records are stored, and may transmit messages to configure, initialize, or update the SIM application (i.e., the service usage monitoring application) control functions 370.

The service platform implemented by SCS 362 may allow cell phone 100 management with the ability to reconfigure, query, and update parameters on the SIM card 105 using SM-PP, OTA, and point-of-sale SIM card programmers. The service platform implemented by the SCS 362 may also support self-provisioning and self-replenishment applications. The architecture may provide the necessary interfaces to the carrier's provisioning system and message mailbox, and to the SCS 362.

The SIM application control tools module 370 on the SCS 362 may receive the SMS messages that were sent by the SIM card 105 and received by the point-to-point SMS client 367. The SIM application control tools module 370 may be utilized by the SCS 362 to analyze and store usage detail records received. The application control tools module 370 may be configured to only access information stored within the second memory device 215/second portioned memory of the SIM card 105, for security purposes.

The SCS 362 may also include an OTA gateway client 383 which may communicate with the OTA gateway 355 via the Internet 381. The SCS 362 may also include a wireless Internet gateway 385 which may communicate with the OTA gateway 355 via the Internet 381. The wireless Internet gateway 385 may be in communication with a Wireless Markup Language ("WML") server 390. The WML server 390 may communicate with a trusted operator services module 393. The trusted operator services module 393 may be utilized, e.g., to provide an interface to allow the user to purchase goods and provides security for such transactions.

The service usage monitoring application 220 within the SIM card 105 is a proactive SIM card application to achieve improved monitoring of service usage by the wireless device, real time call control, and customer communications. The service usage monitoring application 220 is used in combination with a server-based record processing, storage, and provisioning platform (located within SCS 362). The service usage monitoring application 220 operates by monitoring and reporting call, SMS, and other communications activity for a particular cell phone 100 to the SCS 362, which may be located at a remote site. More specifically, the service usage monitoring application 220 uses a modified SIM card 105 programmed to monitor every service usage event, initiated or received by the cell phone. The service usage monitoring application 220 creates and stores on the SIM card 105 a record of the call duration for each call and/or the number of the SMS messages sent or received. At a predetermined time, the service usage monitoring application 220 causes the information stored on the SIM card to be sent via an SMS message to the SCS 362.

Figure 8:
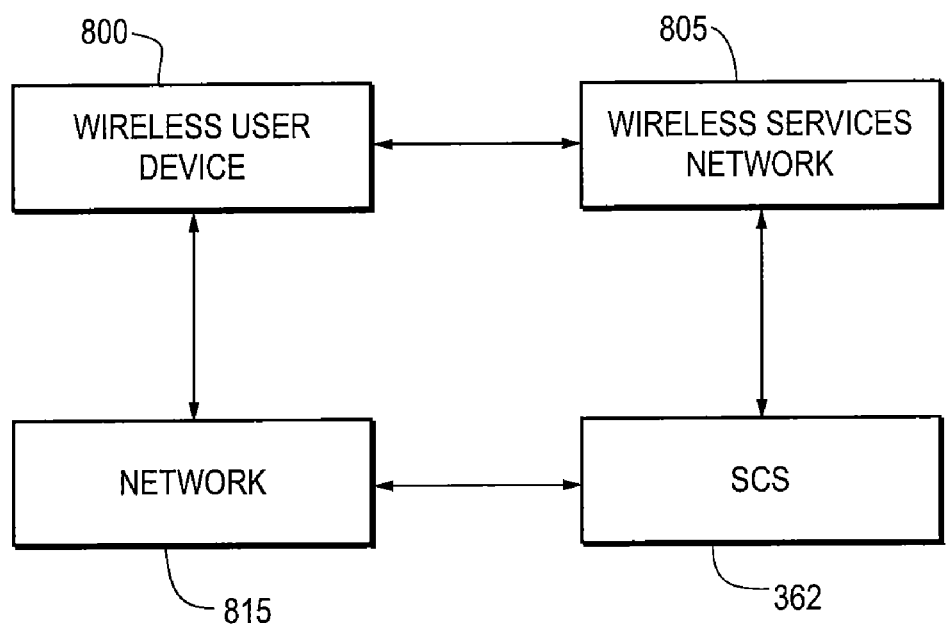
FIG. 8 illustrates a diagram of another cellular system according to an embodiment of the invention.

FIG. 8 illustrates a diagram of another cellular system according to an embodiment of the invention. A wireless user device 800 includes a processor 825 in communication with a memory 820. The memory 820 may store code for the service usage monitoring application 220 and application data (e.g., for a SIM card 105). The wireless device 800 may communicate with a wireless services network 805 via wireless technology-based services (e.g., GSM Voice, SMS, etc.). The wireless services network 805 may be a GSM/GPRS/SMS network. The wireless services network 805 may communicate with the SCS 362 via an interface. The interface (e.g., a proprietary interface to a switch manager) may be utilized to activate and/or suspend a user's services. The SCS 362 may interface with a network 815. The network 815 may be utilized for the transport (e.g., via SMS messages) of reports and control messages to and from the service usage monitoring application 220 and the SCS 362. In some embodiments, the network 815 may be the same as the wireless services network 805.

Figure 4A:
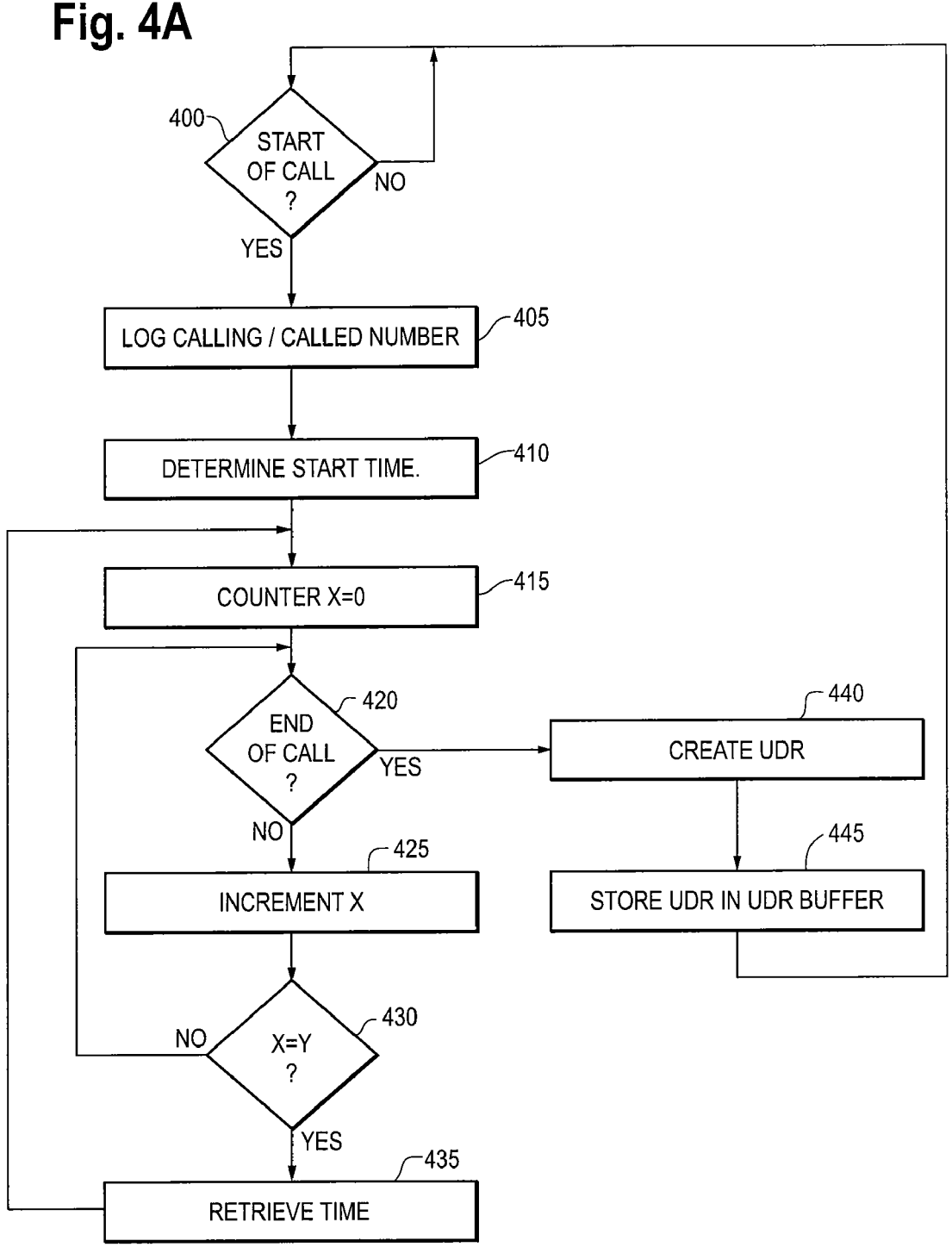
FIG. 4A illustrates a service usage monitoring method implemented by a wireless system according to an embodiment of the invention.

FIG. 4A illustrates a call monitoring method implemented by the cellular system 300 according to an embodiment of the invention. First, the service usage monitoring application 220 detects 400 whether a call/service usage has begun. The service usage monitoring application 220 monitors each call using two events: "CALL CONNECT" and "CALL DISCONNECT." These events are sent by the cell phone 100 to the SIM card 105 at call connection and call disconnection. For each call/service usage monitored, the SIM card 105 measures the duration by retrieving the handset time at the beginning and at the end of the call/service, or by using the available timers on the mobile to determine the length of services consumed, or by counting service events, such as SMS messages, transactions, downloads, etc.

Next, the service usage monitoring application 220 logs 405 the calling number (for inbound calls/services) or the called number (for outbound calls/services). The service usage monitoring application 220 then determines 410 the start time of the call or service—this may be taken from the clock/timer 165. A counter x may then be initialized 415 to the value "0". At operation 420, the service usage monitoring application 220 determines 420 whether the call or service usage has ended. If "no," processing proceeds to operation 425, where counter x is incremented. If "yes," processing proceeds to operation 440. At operation 430, the service usage monitoring application 220 determines whether counter x is equal to y, a preset threshold value. If "no," processing returns to operation 420. If "yes," processing proceeds to operation 435, where the time is retrieved from the clock/timer 165. The reason for using the counter and retrieving the time during the call is so that an accurate call/service usage length can be determined in case there are any unexpected interruptions of power. In other embodiments, a method where a counter in decremented may be utilized.

At the end of each call/service usage, the service usage monitoring application 220 creates 440 a Usage Detail Record (UDR), which may include (a) the type of call/service usage (e.g., inbound or outbound, SMS, GPRS, etc.), (b) the destination address or the calling/service usage address (depending on the type of call/service usage), and (c) the duration/count of the call/service usage. The service usage monitoring application 220 may accumulate 445 the UDRs in a UDR buffer.

Figure 4B:
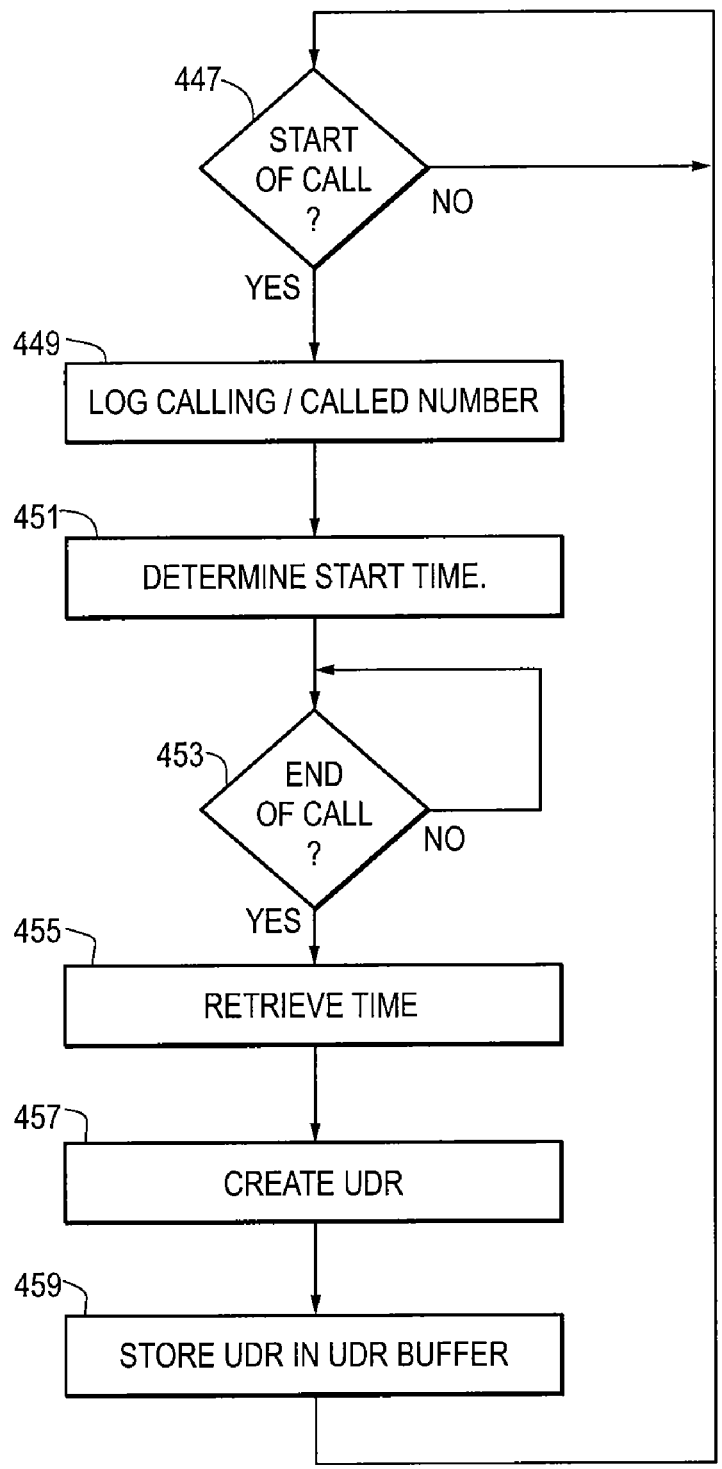
FIG. 4B illustrates an alternative call monitoring method implemented by the cellular system according to an embodiment of the invention.

FIG. 4B illustrates an alternative service usage monitoring method implemented by the UDR application 300 according to an embodiment of the invention. First, the service usage monitoring application 220 detects 447 whether a call/service usage has begun. Next, the service usage monitoring application 220 logs 449 the calling number (for inbound calls/services) or the called number (for outbound calls/services). The service usage monitoring application 220 then determines 451 the start time of the call or service—this may be taken from the clock/timer 165.

At operation 453, the service usage monitoring application 220 determines whether the call or service usage has ended. If "no," processing stays at operation 453. If "yes," processing proceeds to operation 455, where the end time is retrieved from the clock/timer 165.

At the end of each call/service usage, the service usage monitoring application 220 creates 457 a UDR for the call/service usage. The service usage monitoring application 220 may then store the UDR 459 in the UDR buffer.

Figure 4C:
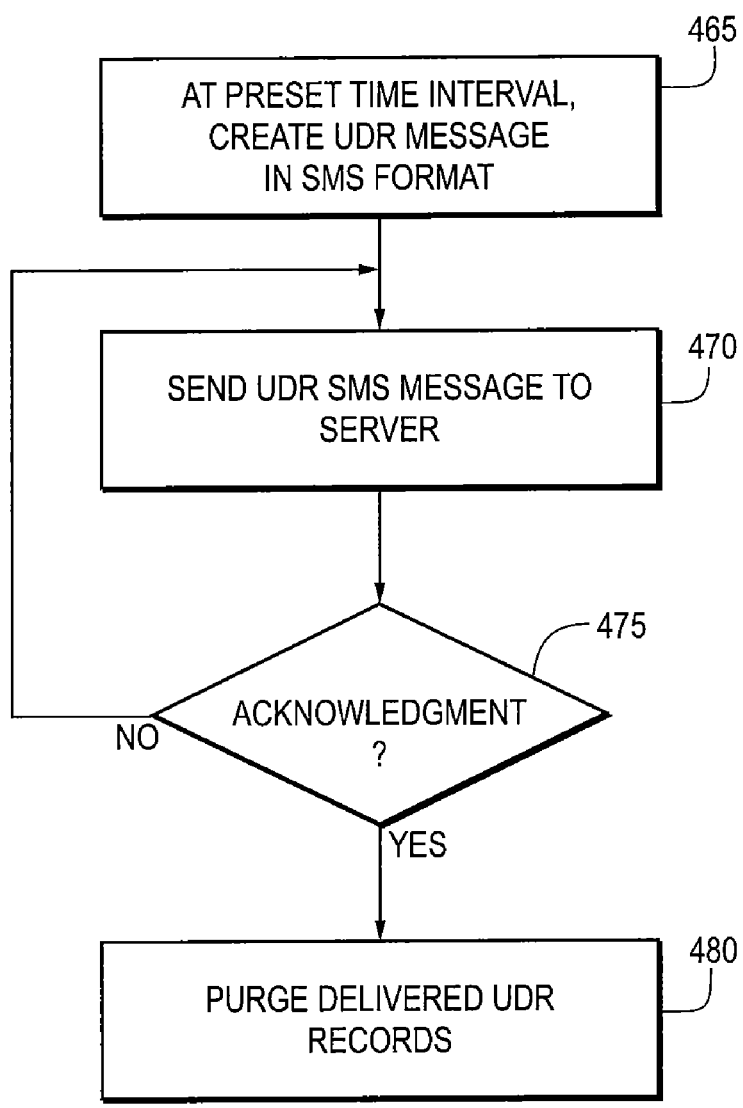
FIG. 4C illustrates a service usage record reporting method implemented by a wireless system according to an embodiment of the invention.

FIG. 4C illustrates a UDR reporting method implemented by the UDR application 300 according to an embodiment of the invention. First, at a predefined frequency, the service usage monitoring application 220 creates 465 a UDR message in SMS format, fills it with the maximum number of UDRs possible, and adds SMS counters and a security layer. The UDR SMS message is then sent 470 to the SCS 362. The UDR SMS message may be encrypted. The service usage monitoring application 220 checks 475 for acknowledgement of receipt. If no acknowledgment is received, processing returns to operation 470. However, if acknowledgement is received, the delivered UDR records are purged 480 from the UDR buffer. If the cell phone 100 is powered-off before the SMS is sent, the service usage monitoring application 220 attempts to send it again when the cell phone 100 powers on again.

The service usage monitoring application 220 also monitors inbound and, if possible, outbound short messages. This is done by incrementing an inbound SMS counter and an outbound SMS counter each time a text message is received or sent.

The service usage monitoring application 220 monitors inbound short messages by filtering the modifications made in the SMS file by the phone. Each time, the phone updates a record in the SMS file with the status byte set to "Message received by MS from network; message to be read," the service usage monitoring application 220 increases the inbound SMS counter by one.

The service usage monitoring application 220 also monitors outbound short messages. Each time the user attempts to send an SMS message, the service usage monitoring application 220 authorizes it and increments the outbound SMS counter by one. In other embodiments, this SMS control and reporting need not be performed.

The service usage monitoring application 220 may request the cell phone 100 to disconnect the call or end the service by sending a refresh command. This will cause the cell phone 100 to run a GSM session termination procedure and to disconnect any ongoing calls/services. Subsequently, the cell phone 100 will activate the SIM card 105 again and start a new session.

Figure 4D:
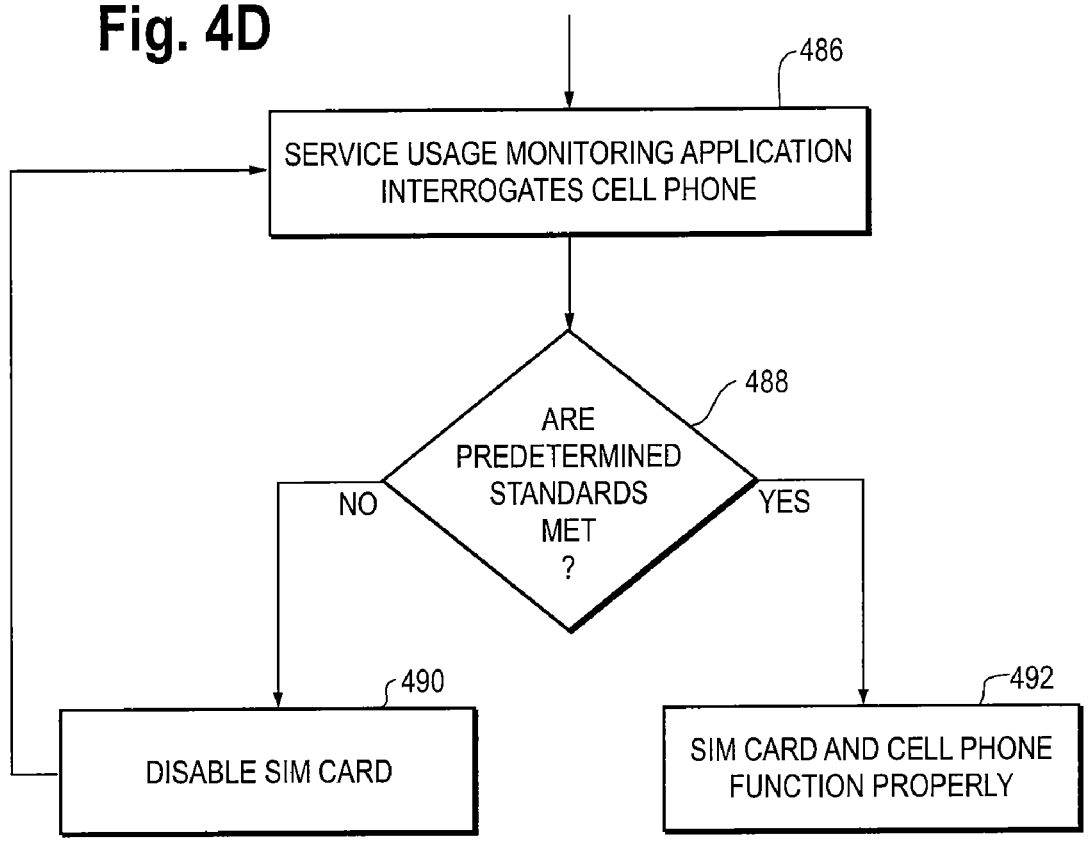
FIG. 4D illustrates a method of disabling the SIM card when predetermined standards are not met by the phone according to an embodiment of the invention.

FIG. 4D illustrates a method of disabling the SIM card 105 when predetermined standards are not met by the phone according to an embodiment of the invention. First, the service usage monitoring application 220 interrogates 486 the cell phone 100. Next, the service usage monitoring application 220 determines 488 whether certain predetermined standards (e.g., SIM call control and SMS capability) are present. If they are not present, then the service usage monitoring application disables 490 the SIM card 105. If they are present, then the SIM card 105 and the cell phone 100 may function 492 properly.

The service usage monitoring application 220 may be remotely controlled by the SCS 362. The SIM card 105 may receive an encrypted control message from the SCS 362, the control message including parameters to control the service on the cell phone 100 and optimize a reporting frequency of messages containing the UDR records. The parameters may include (a) a time frequency at which the message is sent to the SCS 362; (b) a message size threshold before the message is sent; (c) a service count limit of services utilized on the cell phone 100 prior to the reporting messages being sent; and (d) a maximum call length allowed.

The parameters may also include an ability to command the SIM card to immediately send the reporting message(s), and set a transmission time of the reporting message(s) according to a predefined event such as power-up and power-down. The control message can enable or disable various modes of service, such as: inbound service, outbound service, Short Message Service, voice service, General Packet Radio Service, transaction service, and download service. The receipt of the control message and the transmission of the UDR records may be transparent to a user of the phone (i.e., the user may not even know that the control message has been received by the cell phone 100, or that the UDR records have been transmitted). The control message may cause an updating of the service usage monitoring application 220 by downloading new code libraries to the service usage monitoring application 220 and commanding the service usage monitoring application 220 to utilize the new code libraries and purge old code libraries.

Figure 7A:
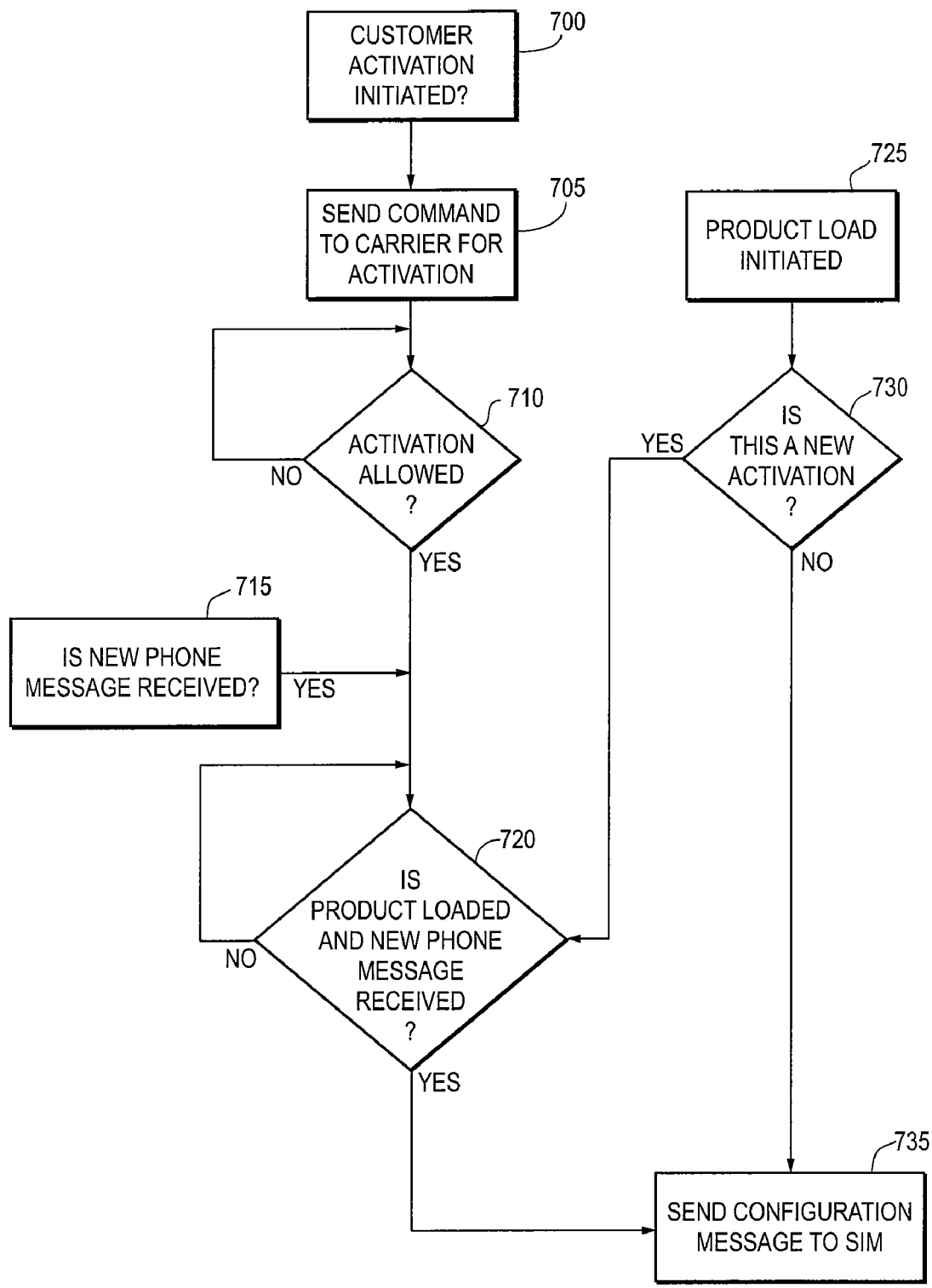
FIGS. 7A and 7B illustrate a method of remotely controlling services on a cell phone utilizing a SIM card implementing a service usage monitoring application according to an embodiment of the invention.
Figure 7B:
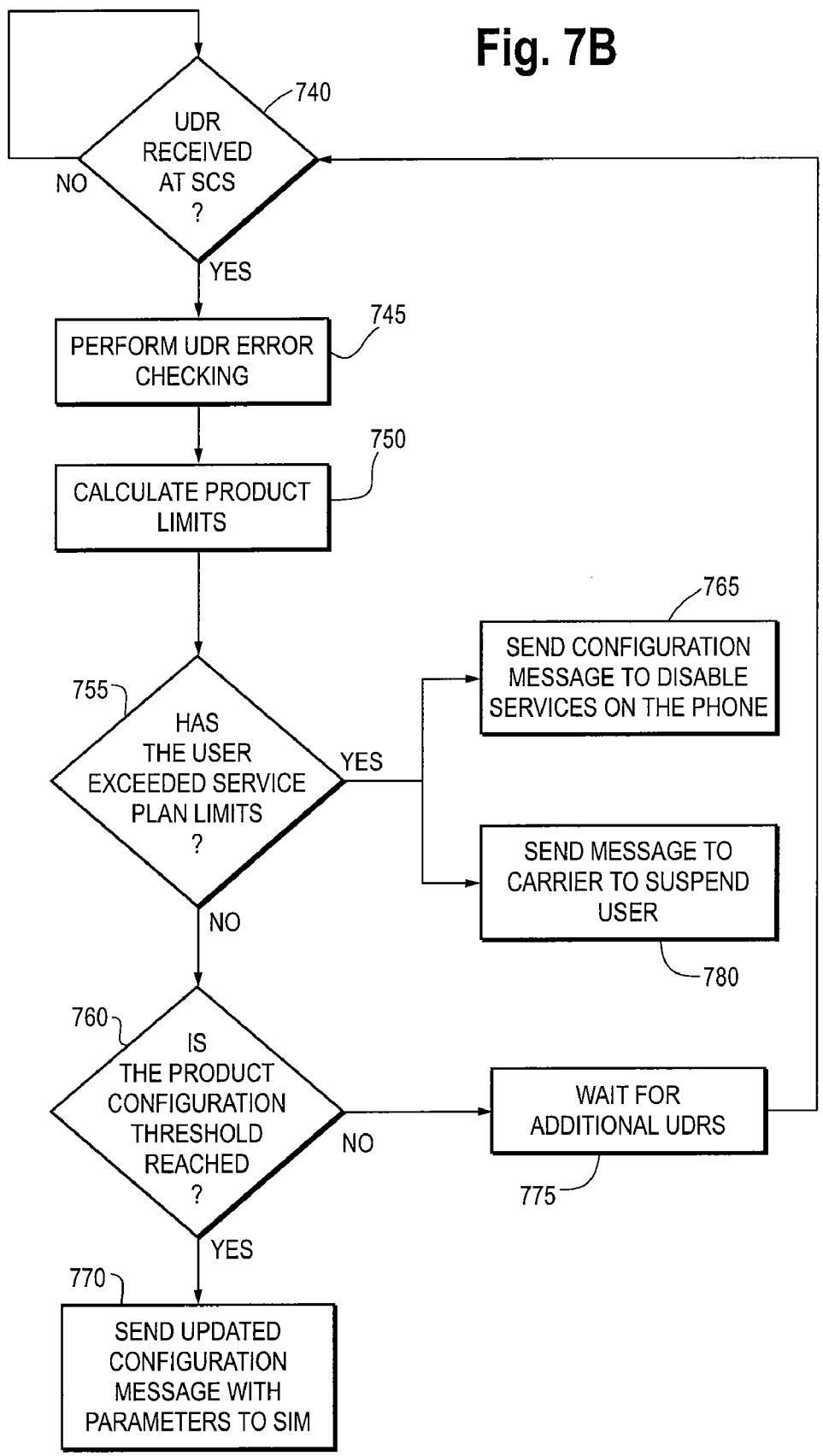

FIGS. 7A and 7B illustrate an additional method of remotely controlling services on a cell phone 100 utilizing a SIM card 105 implementing a service usage monitoring application 220 according to an embodiment of the invention. This method may be implemented by a processor or computer at the SCS 362. First, method determines whether a customer activation has been initiated 700. A customer activation may be initiated by a user using the cell phone 100 having the SIM 105 for the first time, e.g. A command is then sent 705 to the carrier's activation system for activation. Next, the method determines 710 whether activation has been allowed. If "no," processing remains at operation 710. If "yes," processing proceeds to operation 720. At operation 715, the method determines whether a new phone message has been received. The new phone message may be received, e.g., when a new user uses the cell phone 100 for the first time. At operation 725, the method initiates a product load. The product load may be initiated where a user has just initiated service after purchasing a new cell phone 100, or a current user has added new services. Next, the method determines 730 whether it is a new activation. If "yes," processing proceeds to operation 720. If "no," processing proceeds to operation 735.

At operation 720, the method determines whether the product (i.e., everything required to implements a service on the phone such as, e.g., software and various parameters associated with the service) is loaded and the new phone message is received. If "no," processing remains at operation 720. If "yes," processing proceeds to operation 735, where a configuration message is sent to the service usage monitoring application 220 running on the SIM card 105 of the cell phone 100. The configuration message may be sent in the SMS format and may be encrypted.

As shown in FIG. 7B, at operation 740 the method determines whether a UDR is received by the SCS 362. If "no," processing remains at operation 740. If "yes," processing proceeds to operation 745 where error checking and message verification (e.g., sych, reconciliation, and enrichment) is performed on the received UDR. Next, the product limits (e.g., service plan parameters) are calculated 750. The method then determines 755 whether the user has exceeded the service plan limits. If "no," processing proceeds to operation 760 where the method determines whether the product configuration threshold has been reached. If "yes," and updated configuration message with parameters is sent 770 to the service usage monitoring application 220 running on the SIM card 105 of the cell phone 100. The configuration message may be encrypted. If "no," processing proceeds to operation 775, and the method waits 775 for additional UDRs to be received, and which point processing returns to operation 740.

If at operation 755, the method determines that the service plan limits have not been exceeded, then processing proceeds to operations 765 and 780. At operation 765, a configuration message is sent by the SCS 362 to the service usage monitoring application 220 running on the SIM card 105 of the cell phone 100. The configuration message may be encrypted. At operation 780, a message is sent to the carrier to inform that the user's service is to be suspended. Alternatively (or additionally), a control message may also be sent to the SIM card 105 to suspend operation locally.

Figure 5:
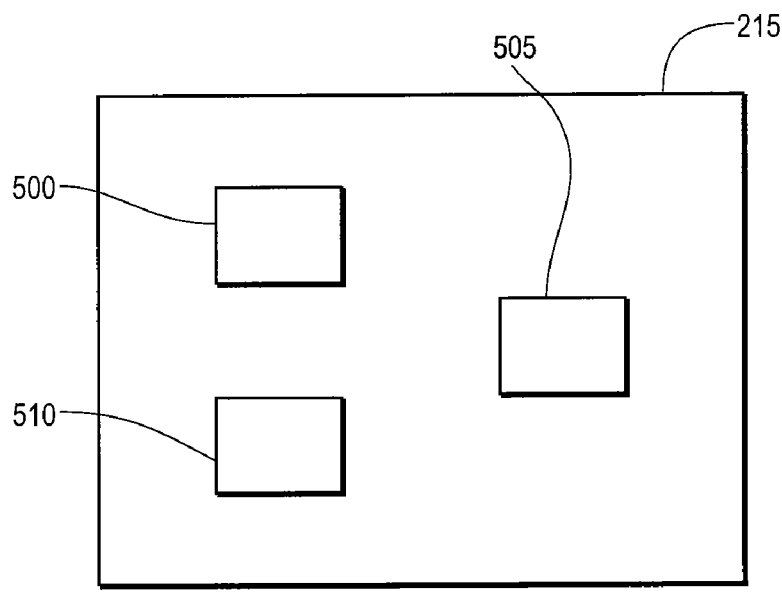
FIG. 5 illustrates components within a memory partition according to an embodiment of the invention.

FIG. 5 illustrates components within the memory 215 according to an embodiment of the invention. The memory 215 may include an inbound SMS counter 500 to keep a record out the number of inbound calls. The inbound SMS counter 500 may be a portion of the memory 215 that is incremented. The memory 215 may include an outbound SMS counter 505 to keep a record out the number of outbound calls. The outbound SMS counter 505 may be a portion of the memory 215 that is incremented. The memory 215 may also include a UDR buffer 510 in which the UDR records may be stored.

Although the embodiments described above all pertain to SIM cards 105 for cellular phone networks, in other embodiments, a cellular phone and cellular network need not be used. Instead, e.g., a Voice-Over-Internet-Protocol ("VOIP") network may be utilized. Other embodiments may also utilize devices other than cell phones. Such devices may accept SIM cards 105—a wireless data card is an example of such as device. Generally, such devices may be communication devices patched over a network. Also, other devices may also utilize additional networks other than GSM or CDMA, such as, e.g., DECT, TDMA, or any other SIM wireless network that accepts a SIM card 105.

While the description above refers to particular embodiments of the present invention, it will be understood that many modifications may be made without departing from the spirit thereof. The accompanying claims are intended to cover such modifications as would fall within the true scope and spirit of an embodiment of the present invention. The presently disclosed embodiments are therefore to be considered in all respects as illustrative and not restrictive, the scope of an embodiment of the invention being indicated by the appended claims, rather than the foregoing description, and all changes which come within the meaning and range of equivalency of the claims are therefore intended to be embraced therein.

What is claimed is:

1. A method of reporting service usage information for a user of a wireless device, comprising:
   detecting and logging information about a service utilized via the wireless device;
   creating a service usage record for the service based on the information;
   storing the service usage record in a buffer;
   creating a reporting message containing at least one service usage record;
   sending the reporting message to a remote storage and control server at an interval based on a triggered event; and
   purging the at least one service usage record from the buffer upon successful transmission of the reporting message, wherein
   the logged information, the service usage record, the buffer, and the reporting message are stored in a memory of wireless device.

2. The method according to claim 1, the reporting message being sent via a GSM wireless communications protocol selected from the group consisting of: Short Message Service, General Packet Radio Service, User Datagram Protocol, and a circuit-switched data calling protocol.

3. The method according to claim 1, the service being selected from the group consisting of: voice calling, messaging, General Packet Radio Service, data calling, execution of a purchase transaction, downloading, streaming media, and picture messaging.

4. The method according to claim 1, wherein the information includes a start time of the service, a destination number when a user of the wireless device initiates an outbound service, and a phone number and an origin number when the user receives an inbound service.

5. The method according to claim 1, further including performing at least one of: periodically updating a record of a length of the service during the use of the service, and logging an end time at the end of the service.

6. The method according to claim 1, the time being determined by referencing a clock/timer on the wireless device.

7. The method according to claim 1, the wireless device being a phone selected from the group consisting of: a GSM cellular phone and a CDMA cellular phone.

8. The method according to claim 1, wherein all unique program code necessary to implement the method is stored in the memory of the wireless device.

9. The method according to claim 1, the triggered event being selected from the group consisting of: time, message size, and an accumulated service usage units count.

10. The method according to claim 1, further including receiving a control message from the remote storage and control server, the control message including parameters to control the service on the wireless device and optimize a reporting frequency of the reporting message.

11. The method according to claim 10, the parameters being selected from the group consisting of: a time frequency at which the reporting message is sent to the remote storage and control server; a message size threshold before the reporting message is sent; a service count limit of the service before the reporting message is sent; and a maximum length for a service usage session allowed by the wireless device.

12. The method according to claim 10, the parameters including an ability to command the wireless device to do at least one of: immediately send the reporting message, and set a transmission time of the reporting message according to a predefined event.

13. The method according to claim 12, the predefined event being selected from the group consisting of: power-up, power-down, defined error condition, wireless device change of state, and detection of user input.

14. The method according to claim 10, wherein the control message causes one of an enabling and a disabling, of modes of service, the modes of service being selected from the group consisting of: inbound service, outbound service, Short Message Service, voice service, General Packet Radio Service, transaction service, data streaming service, and download service.

15. The method according to claim 10, wherein an item, selected from the group consisting of the control message and the at least one service usage record, is transparent to a user of the phone.

16. The method according to claim 10, wherein the control message causes an updating of the service usage monitoring application, by downloading new code libraries to the service usage monitoring application, and commanding the service usage monitoring application to utilize the new code libraries and purge old code libraries.

17. The method according to claim 8, wherein the memory includes a first memory partition on which the unique code is stored, and a second memory partition, and access between the first memory partition and the second memory partition is secure, is controlled locally, and is limited to pre-selected elemental files to control access to a cellular network.

18. The method according to claim 10, wherein the control message shuts off the service on the wireless device when a predetermined service threshold has been met by the wireless device.

19. The method according to claim 10, wherein at least one of the reporting message and the control message are encrypted.

20. The method according to claim 1, the reporting message being sent via a CDMA wireless communications protocol selected from the group consisting of: Short Message Service, 1xRTT, User Datagram Protocol, and a circuit-switched packet data calling protocol.

21. The method according to claim 1, the service being selected from the group consisting of: voice calling, messaging, EvDO, 1xRTT, circuit-switched data, and packet data.

* * * * *